Sept. 11, 1956 W. P. FERM ET AL 2,762,403
POWER OPERATED SCREW SETTER
Filed March 1, 1955
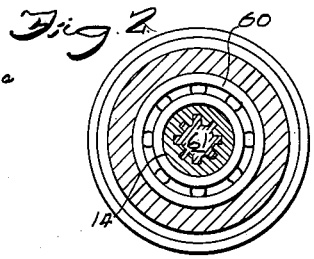
Fig. 2
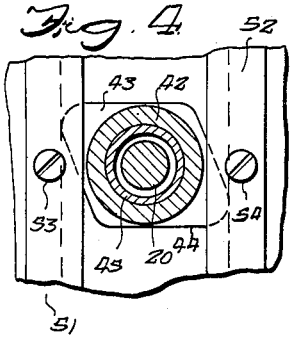
Fig. 4
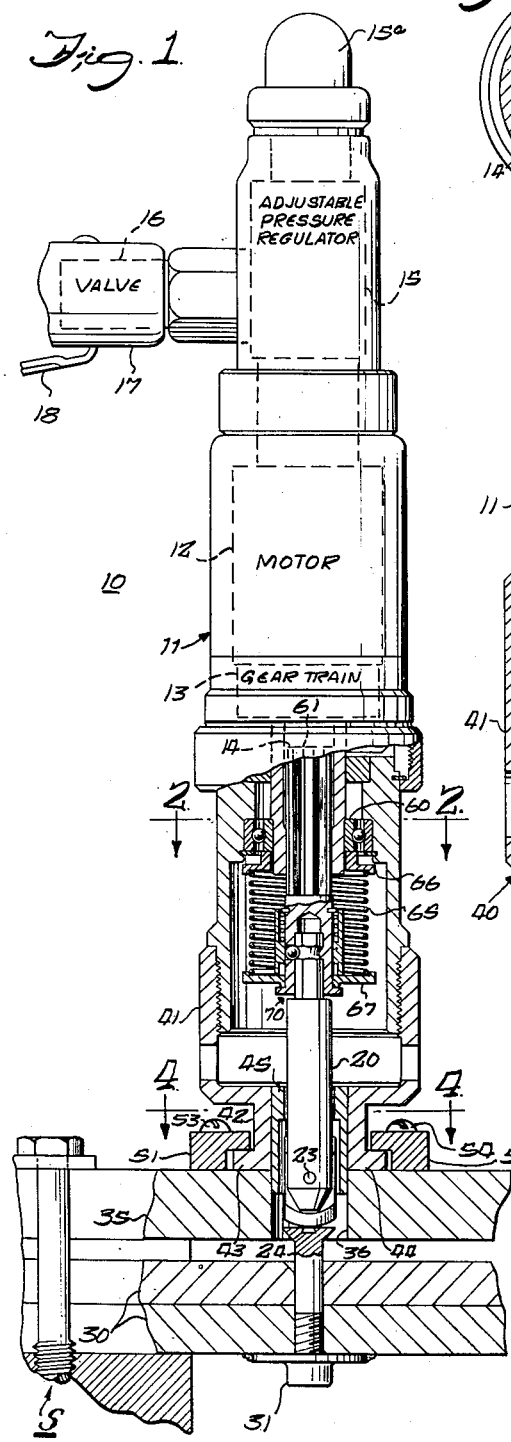
Fig. 1
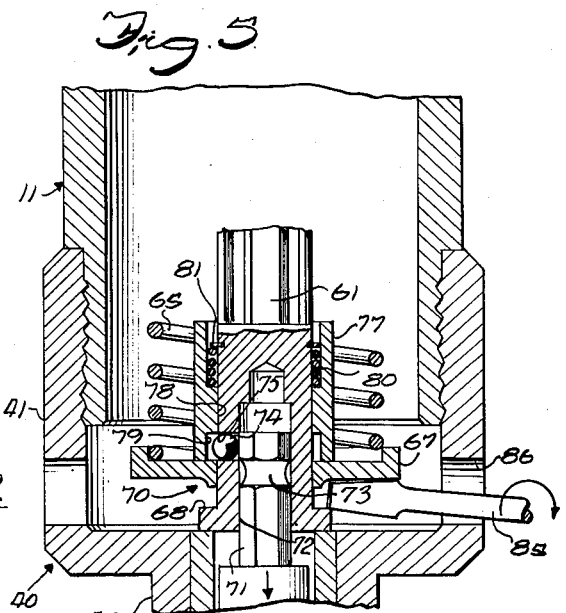
Fig. 5
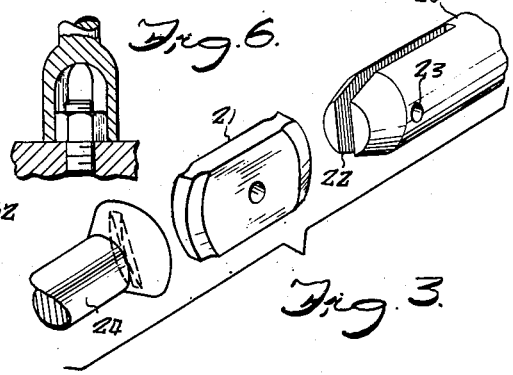
Fig. 6
Fig. 3
INVENTORS:
William P. Ferm
Clarence A. Sorensen
by Carlson, Pitzner, Hubbard + Wolfe
Attorneys United States Patent Office 2,762,403
Patented Sept. 11, 1956

2,762,403

POWER OPERATED SCREW SETTER

William P. Ferm, Springlake, and Clarence A. Sorensen, Fruitport, Mich., assignors to Gardner-Denver Company, Quincy, Ill., a corporation of Delaware Application March 1, 1955, Serial No. 491,248

8 Claims. (Cl. 144—32)

The present invention relates to power tools and more particularly to a tool for setting screws and nuts.

It is an object of the invention to provide a novel screw setter which is convenient to use and which automatically provides high predetermined speed, torque, and axial force. It is a related object to provide a screw setter for use with aircraft screws, particularly screws distinguished by a shallow arcuate groove which is capable of maintaining the bit in alinement with the screw and in which a predetermined axial force is applied to seat the bit in the screw slot.

It is another object to provide a screw setter which is capable of setting a screw at high speed and which makes maximum use of the high torque characteristics of modern aircraft screws.

It is another object to provide a screw setter which is adapted for mounting on a jig plate and which is capable of locating the screw slot promptly and for applying a predetermined pressure thereto over a wide axial range and independent of the spacing between the jig and workpiece.

It is a further object to provide a screw setter which requires a minimum of manual manipulation and which may be employed by unskilled operators in high production work for uniform driving at high speed and with high torque but without risk of breaking either the bit or the screw or damaging the screw slot.

It is still another object to provide a screw setter having novel means for releasing a bit.

In one of its aspects it is an object of the invention to provide an improved procedure for installing a screw or the like in a workpiece.

Other objects and advantages of the invention will become apparent upon reference to the attached detailed description and to the drawing in which:

Figure 1 is a vertical elevation in partial section showing a screw setter constructed in accordance with the present invention.

Fig. 2 is a transverse section taken along the line 2—2 in Fig. 1.

Fig. 3 is a fragmentary perspective of the screwdriver bit and screw head.

Fig. 4 is a section taken along the line 4—4 in Fig. 1 showing the nose mounting arrangement.

Fig. 5 is an enlarged fragmentary view showing the manner in which the screwdriver bit is released.

Fig. 6 shows a modified bit for nut driving purposes.

While the invention is described herein in connection with the preferred embodiment, it will be understood that I do not intend to limit the invention to such embodiment but intend to cover all modifications and alternative constructions which may be included within the spirit and scope of the appended claims.

Turning to the drawings, a screw setter indicated at 10 has a frame or barrel 11 housing a motor 12 and gear train 13 which is connected to a tubular driving or output spindle 14. Air is supplied to the motor 12 from a pressure regulator 15, air being fed to the pressure regulator from a valve 15 which is included within the offset handle 17 of the tool. The valve is operated by a squeeze-type lever 18. The valve, pressure regulator, motor and gear train have been indicated diagrammatically, since such elements are well known to one skilled in this art. The motor may, for example, be of the type shown in Patent No. 2,099,280 and the associated gear train may be of the usual planetary type designed to fit into a relatively limited space. The pressure regulator 15, the purpose of which will become clear as the discussion proceeds, is preferably of the type shown in the application of Kenneth C. Mosier, William P. Ferm and Walter C. Chaffee, Serial No. 416,828, filed March 17, 1954.

Extending downwardly at the lower end of the tool is a screwdriver bit 20. Such bit terminates in a tip 21 which is freely pivoted in a slot 22, being held in place by a transverse pin 23. Both ends of the tip 21 are arcuate in outline and undercut to fit the undercut slot formed in the head of a screw 24, such screw being of an improved design recently developed for the aircraft industry.

As an aid in illustrating the present invention, a workpiece 30 is shown fragmentarily in the drawing, consisting of two layers which are to be screwed securely together. For the purpose of receiving the screw 24 a flange type nut 31 is provided, such nut being tack-welded or otherwise secured to the underside of the workpiece. Arranged opposite the face of the workpiece is a jig plate 35 having a hole 36 which is alined with the hole in the workpiece as a result of a preceding drilling operation. Any suitable means can be employed for fastening the work and jig in fixed relation to each other, such, for example as the clamping bolt and spacer arrangement indicated generally at S in Fig. 1.

In accordance with one of the aspects of the present invention a detachable coupling is provided at the lower end of the tool for supporting the tool 10 on the jig plate and for guiding the lower end of the bit along the axis of the hole 36 and screw 24. In the present instance such support is provided by a hollow cylindrical nosepiece having a body portion 41 which is screwed to the lower end of the barrel 11 and a tip portion 42 having lateral bayonet projections or lugs 43, 44. Arranged within the tip portion 42 of the nosepiece is a pilot bushing 45 which surrounds the shank portion of the screwdriver bit 20 and which extends into the hole 36 in the jig plate.

For receiving the nosepiece and for anchoring it to the jig plate, opposed anchoring members 51, 52 are provided, being secured to the jig plate by screws 53, 54. As shown in the drawing, the anchoring members 51, 52 are undercut forming a bayonet type of connection with the lugs 43, 44 on the tool. In mounting the tool on the jig plate the tip of the nosepiece is inserted between the anchoring members 51, 52 and in register with the hole 36, following which the tool is rotated a quarter turn into the position shown in Fig. 4, the lugs being held captive until the tool is intentionally released.

Having understood the overall arrangement and mounting of the tool more detailed attention may be given to the coupling between the tubular driving spindle 14 and the screwdriver bit 20. As shown in Figs. 1 and 2, the driving spindle is mounted for rotation in an antifriction bearing 60. Mounted within the driving spindle is a splined shaft 61, the spindle 14 and the shaft 61 having female and male splines, respectively, permitting the shaft 61 to transmit torque regardless of its axial position. In practicing the present invention means are provided for urging the splined shaft and its connected bit outwardly with respect to the body of the tool. This outward urging is brought about by means of a coil spring 65. At its upper end the coil spring 65 is seated on an annular retaining disk 66 which in turn bears against the inner race of the bearing 60 supporting the driving spindle. At its lower end the coil spring 65 is seated on a spring retaining disk 67 which is supported on a flange or shoulder 68 formed on the lower end of the splined shaft 61. Thus, when the tool is anchored in place by the anchoring members 51, 52, a force is applied downwardly upon the screwdriver bit urging the bit into positive engagement with the slot in the screw.

In accordance with one of the more detailed aspects of the invention a novel quick-disconnected coupling 70 is provided between the spline shaft 61 and the screwdriver bit 20. For purposes of torque transmission the upper end 71 of the screwdriver bit 20 is made hexagonal for mating with the corresponding hexagonal hole or recess 72 formed in the end of the spline shaft. For positively locking the screwdriver bit in its seated position, a modified ball and groove connection is employed including a groove 73 and ball 74, the ball being constrained to move radially in a hole 75 provided in the wall of the member 61. To maintain the ball in its seated or locking position, a locking sleeve 77 is provided having a blocking surface 78 and an annular recess 79 adjacent thereto. Arranged within the sleeve 77 is a sleeve return spring 80 which bears against a retaining ring 81 seated in an appropriate groove in the shaft 61. It will be apparent that when the screwdriver bit 20 is fully inserted as shown in Fig. 1, the ball 74 engages the groove 73. The ball is held in such locking position by the locking sleeve 77 which is pressed downwardly by the return spring 80.

With regard to releasing the bit, it will be noted in the drawing that the locking sleeve 77 bears against the outer spring retainer 67 and the spring retainer is undercut opposite the shoulder 68 to provide a prying slot. Consequently, when it is desired to release the bit, it is sufficient to insert the tip of a conventional screwdriver 85 through a hole 86 formed in the wall of the nosepiece 40 and into the prying slot, following which the screwdriver is twisted into the position shown in Fig. 5. This causes the spring retainer to be unseated from the shoulder or flange 68 and moves the locking sleeve upwardly permitting the ball 47 to be released into the recess 79 at the lower end of the locking sleeve. With the ball thus free, it will be apparent that the bit 20 may be readily withdrawn and replaced by a bit of different size.

When operating the present tool, the pressure regulator 15 is adjusted by means of an adjusting knob 15a to produce a motor torque which is at a high value but sufficient for uniform and position setting of the screws and which is, in any event, below the point which will cause rupture of the screw slot. To insure firm seating, the coil spring 65 which urges the screwdriver bit outwardly is designed to exert a force on the order of 11 to 22 pounds over the range of axial movement of the screwdriver bit. Preferably, the spring is one of low rate having a normal length of 3 inches and operating in use over a range of 2 inches maximum to ¾ inch minimum. The tool described, being inherently capable of a long stroke, for example on the order of 1 inch or more, is thus ideally suited to a wide variation in jig-to-work spacing.

Since the tool is secured in a precisely perpendicular position by the anchoring members 51, 52, and since the downward force is applied directly along the screw axis, optimum engagement between the bit and screw head is assured. The tip of the bit will usually seat itself in the screw slot when the tool is attached, but in the event that seating does not take place at that time, it will be understood that the seating takes place during the first half revolution of the bit as the latter is driven by the air motor.

In operation, opening of the valve 16 causes air to be applied at predetermined pressure to the motor 12 thereby rotating the tubular driving spindle 14. The spindle rotates the spline shaft 61 which in turn rotates the screwdriver bit 20 advancing the screw 24 into full threaded engagement with the nut 31, securing the two parts of the workpiece firmly together. If desired the valve 16 may be provided with a latch so that it remains open after the valve operator 18 has been actuated. It would thus be possible for a single workman to handle several screwsetters of the present type moving them from one hole to another in the jig plate. Where the screw setter operates unattended during the driving of the screw the motor 12 will stall at a predetermined torque, the torque being determined by the setting of the pressure regulator 15. After such stalling is noted by the operator, the valve is released and the tool may be removed by disengaging the bayonet connection.

It will be apparent from the foregoing that the screw setter which has been described fills all of the possible requirements operating at a high speed and exerting a torque which is just short of that which will cause damage to the screw. Not only is the bit locked in a position precisely coaxial with the screw, but the reaction forces both axially and in torsion are absorbed by the bayonet connection provided by the anchoring members 51, 52. This completely overcomes operator fatigue and tends to insure that each screw is completely "set." Completion of the setting operation is further insured where a valve latch is employed, since the forces at the anchoring members are sufficiently great under operating conditions so as to prevent disengagement while the motor is in operation.

As one aspect of the invention it is proposed to employ common anchoring means for both drilling the hole in the workpiece and for setting a screw through such hole without moving the jig, thereby insuring that the drilling tool and screw setter are alined along precisely the same axis during their respective operations. More specifically, we propose that a drilling tool be used constructed in accordance with the teachings of Taylor Patent 2,541,306 but having a nosepiece dimensionally corresponding to the nosepiece used in the present nut setter and capable of bayonet engagement with the anchor members 51, 52 described herein. In following the preferred procedure therefore the following operations are performed in sequence: The jig plate providing a hole 36 and symmetrically spaced anchoring members 51, 52 is arranged opposite the workpiece. The drilling piece is then secured to the anchoring members with the pilot bushing of the tool inserted in the hole 36 of the jig plate. Upon completion of the drilling operation the drilling tool is removed and a flange type nut is tack-welded or otherwise secured to the underside of the workpiece in alinement with the drilled hole. Following this a screw 24 is inserted into the hole and the present screw setter applied to drive the screw home as described in some detail above. After the procedure has been followed at each working position, the jig plate is removed.

While the invention has been described above in connection with a screw setter, it will be apparent to one skilled in the art that the invention is equally applicable to the running and setting of nuts, a bit suitable for this purpose being shown in Fig. 6. Consequently, the terms "screw" and "screw head" shall be understood to refer generally to a threaded fastening element, taking the form of either a screw or nut.

We claim:

1. A screw setting tool for use with a drill jig having anchoring means thereon, the combination comprising a barrel having a hollow cylindrical nose portion adapted for releasable but rigid connection with said anchoring means, a driving spindle concentrically arranged therein, a drive shaft having an elongated splined connection with said driving spindle and axially slidable with respect thereto, torque-limited means for driving the driving spindle, a bit coupled to the end of the drive shaft, and means including a spring interposed between said drive spindle and said drive shaft for urging the bit outwardly into contact with the screw.

2. A screw setting tool for use with a drill jig having bayonet-type anchoring means thereon, the combination comprising a barrel having a hollow cylindrical nose portion adapted for rigid connection with said anchoring means, a driving spindle concentrically arranged therein, a drive shaft having an elongated splined connection with said driving spindle and axially slidable with respect thereto, torque-limited means for driving the driving spindle, a bit rotatably mounted in the nose of the tool and coupled to the end of the drive shaft, and means including a spring interposed between said drive spindle and said drive shaft for urging the bit outwardly into contact with the screw.

3. A screw setting tool for use with a drill jig having bayonet-type anchoring means thereon, the combination comprising a barrel having a hollow cylindrical nose portion adapted for rigid connection with said anchoring means, a driving spindle concentrically arranged therein, a drive shaft having an elongated splined connection with said driving spindle and axially slidable with respect thereto, means including an air motor for driving the driving spindle, a bit rotatably mounted in the nose of the tool and coupled to the end of the drive shaft, means including a spring interposed between said drive spindle and said drive shaft for urging the bit outwardly into contact with the screw head, a source of air, and a pressure regulator interposed between said source and said motor for limiting the maximum torque developed by said motor.

4. A screw setting tool for use with a drill jig having an aperture and bayonet-type anchoring means adjacent thereto, the combination comprising a barrel providing a hollow cylindrical nose portion having a pilot bushing projecting therefrom for snug reception in said aperture and adapted for rigid connection with said anchoring means, driving means including a motor, a drive shaft having a spline type connection with said driving means and axially slidable with respect thereto, a bit coupled to the end of said drive shaft and rotatable in said pilot bushing, and means including a spring interposed between said drive shaft and said driving means for urging the shaft outwardly for resilient engagement between said bit and the screw.

5. In a power driven tool for use with a drill jig having anchoring means thereon for supporting the tool relative to a workpiece, the combination comprising a barrel, a drive spindle rotatively mounted therein, a drive shaft having an elongated splined connection therewith for relative sliding movement, said drive shaft providing a socket at its outer end for engagement with an annularly grooved bit, a ball received in an aperture formed in the wall of said socket, a locking sleeve telescoped over said socket for normally locking said ball in seated position in said groove, means for urging the drive shaft and connected bit outwardly of the tool, said barrel having a cylindrical nosepiece surrounding said bit and adapted for detachable bayonet-type connection with said anchoring means, and said nosepiece having an aperture in the wall thereof for insertion of a tool for imparting unlocking movement to said sleeve.

6. In a power driven tool a driving arrangement comprising in combination a drive spindle, a drive shaft having an elongated splined connection therewith for relative sliding movement, said drive shaft providing a socket at its outer end for engagement with an annularly grooved bit, a ball received in an aperture formed in the wall of said socket, a locking sleeve telescoped over said socket for normally locking said ball in seated position in said groove, said socket having a retaining collar loosely surrounding the same but maintained captive against outward movement therefrom, a coil spring seated against said retaining collar for urging the drive shaft and connected bit outwardly of the tool, said locking sleeve being normally seated on said retaining collar so that compressive movement applied to said retaining collar serves simultaneously to compress said spring and to slide the collar in the unlocking direction for release of said bit.

7. In a power driven tool a driving arrangement comprising in combination a barrel, a drive spindle journaled therein, a drive shaft having an elongated splined connection therewith for relative sliding movement, said drive shaft providing a socket at its outer end for releasable engagement with a bit, said socket having a retaining collar loosely surrounding the same but maintained captive against outward movement therefrom, a coil spring seated against said retaining collar for urging the drive shaft and connected bit outwardly of the tool, said socket having a bit releasing element seated on said retaining collar so that compressive movement applied to said retaining collar serves simultaneously to compress said spring and to move the releasing element in the unlocking direction for release of said bit.

8. The method of fastening superimposed plate members together which are oriented in relation to a drill jig having a pilot hole and associated anchoring members in a desired relationship with respect thereto, and in which a drilling tool secured to said anchoring means coaxial with respect to the pilot hole was utilized to drill a hole in the plate members, which method comprises inserting a screw fastening device into the hole drilled in the plate members while maintaining the drill jig in its initial position with respect to the plate members, attaching to said anchoring means a screw setting tool having a bit and having means for rotating and impelling said bit with the bit arranged coaxially with respect to the holes in the jig and plate members, applying power to said screw setting tool for screwing home the screw fastening device, and removing said screw setting tool and said jig from said plate members.

References Cited in the file of this patent

UNITED STATES PATENTS

| | | |
|---|---|---|
| 1,578,232 | Ferris | Mar. 23, 1926 |
| 1,642,490 | Decker | Sept. 13, 1927 |
| 1,954,620 | Connell | Apr. 10, 1934 |
| 2,346,352 | Boxell | Apr. 11, 1944 |
| 2,565,505 | Lamb | Aug. 28, 1951 |
| 2,605,792 | Havener | Aug. 5, 1952 |